United States Patent [19]

Matthews

[11] 4,080,868
[45] Mar. 28, 1978

[54] SUPPORT AND RETENTION MECHANISM FOR MISSILES IN LAUNCHERS

[75] Inventor: Fredric A. Matthews, Atlanta, Ga.

[73] Assignee: Lockheed Corporation, Burbank, Calif.

[21] Appl. No.: 771,944

[22] Filed: Feb. 25, 1977

[51] Int. Cl.² ............................................. F41F 3/06
[52] U.S. Cl. ................................. 89/1.806; 89/1.816; 89/1.817; 285/18
[58] Field of Search ................. 89/1.806, 1.816, 1.817, 89/1.812, 1.8; 285/18

[56] References Cited

U.S. PATENT DOCUMENTS

| 2,930,288 | 3/1960 | Jonah | 89/1.817 |
| 3,187,631 | 6/1965 | Cromwell | 89/1.806 |
| 3,296,929 | 1/1967 | Jacobson | 89/1.806 |
| 3,548,708 | 12/1970 | Hubigh | 89/1.806 X |
| 3,754,726 | 8/1973 | Rusbach | 89/1.806 X |

FOREIGN PATENT DOCUMENTS 1,043,875 11/1958 Germany ........................... 89/1.806

*Primary Examiner*—David H. Brown
*Attorney, Agent, or Firm*—Billy G. Corber; John J. Sullivan

[57] ABSTRACT

The proposed support and retention mechanism makes it feasible to hot launch missiles or anti-missile missiles especially from aircraft using constant section, open ended, vertical or nearly vertical launch tubes to significantly increase missile range or payload without increasing the missile weight. This bazooka method of launching, results in much lighter launch tubes and support structure and no appreciable reaction on the aircraft. The hot launch feature permits a simplification of the method of storing such missiles as the Polaris, Poseidon and Trident in missile launch submarines. At the same time the jettison feature permits missiles to be stored and released from a vertical position which can increase the load passing through a smaller bomb bay and result in decreased aircraft weight.

8 Claims, 5 Drawing Figures

SUPPORT AND RETENTION MECHANISM FOR MISSILES IN LAUNCHERS

This invention relates to missile launchers generally and more particularly to a support and retention mechanism for missiles when disposed in such launchers, being especially designed and adapted for launchers which are mounted on vehicles and subjected to relatively large forces and loads, (on the order of 5 g's) tending to release them prematurely.

So-called "hot" launch of missiles from aircraft in flight offers several advantages over the more conventional or "cold" launch. In hot launches ejection is by rocket power, i.e., by means of ignition and expansion of hot or burning gases, wherein relatively light and uncomplicated tubes are employed to contain the missile and guide it when fired and launched. In contrast, in cold launches relatively massive and complex extraction apparatus including rails and tracks are required to properly dispose the missile free of the aircraft prior to being fired.

Efforts to take advantage of the above and other advantages of hot launches of missiles from aircraft have not been very successful. One such prior scheme relies upon the crushing of an unstable material employed to contain or pack the missile in its tube. Another employs an eutectic material which melts away to release the missile. Both of these proposals are marginally safe and unpredictable to a point which has discouraged hot launches.

In addition, emergency provisions are necessary with hot launches to rapidly dispose of the missile in the event of failure, misfire or other abortions. Thus, the support and retention device employed to assure against premature ejection under severe loads and forces accompanying rough flight and landing conditions, must include reliable release means not only when the missile is fired but also when it fails to ignite.

The foregoing conditions and requirements are aggravated by the fact that it is most desirable that bazooka-type hot launches are employed on aircraft. This is for the obvious reason that with intermediate range ballistic missiles (IRBM) and up, as normally the case in hot launches, the reaction to firing and launch is otherwise detrimental to the flight path of the airplane, requiring special compensating additives.

The present invention proposes a solution to the above and other problems by providing a support and retention mechanism for missiles in their launchers which so disposes each missile in a substantially vertical, open ended tube as to permit the automatic release of the missile during hot launch. Such hot launch may be effected either by igniting the missile propellant or by igniting a booster attached to the lower extremity of the missile. Where the booster is employed it is separated from the missile after the missile clears the aircraft. This mechanism also permits the missile to be jettisoned if it fails to ignite on command or is otherwise to be discarded.

The mechanism herein contemplated securely supports the missile under all flight and landing conditions, permits the missile to be loaded, unloaded, fired in flight and jettisoned in flight. It is designed and constructed to withstand predetermined loads to which the missile is expected to be subjected during all aircraft operations. Usually such loads are in the order of 2.0 gs upward and 4.5 gs downward with fore and aft loads and side loads being less critical due to their transfer directly into the launch tube.

The launch tube for each missile has a constant inside diameter and is open at both ends permitting a bazooka type launch upward or jettison of the missile downward by gravity. Doors at the top and bottom of the fuselage overlie and cover the ends of each tube in flight, being opened just prior to missile launch. The doors are, therefore, already open should it be necessary or desirable to jettison a missile.

The support and retention mechanism for each missile in its launch tube essentially includes one or more dogs carried by the launcher and engageable with the missile. Such engagement is effected by a slideable retainer carried by the launcher acting on and against each dog with a force that is less than that of the missile thrust when ejected or fired. Movement of the retainer by missile thrust releases each dog whereby upward movement of the missile in the launcher results. Jettison or downward movement of the missile is accomplished by hydraulic pressure applied on the retainer to move it and thereby release each dog permitting gravity drop of the missile.

With the above and other objects in view as will be apparent, this invention consists in the construction, combination and arrangement of parts all as hereinafter more fully described, claimed and illustrated in the accompanying drawings wherein:

Figure 1:
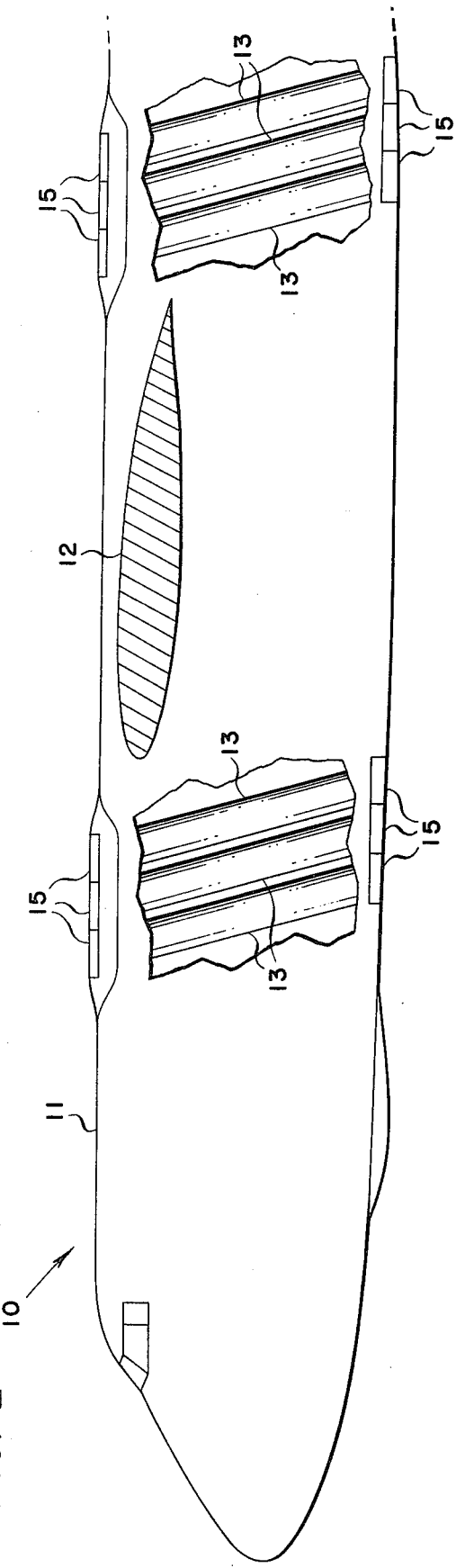
FIG. 1 is a longitudinal inboard profile of an aircraft incorporating a plurality of missile launch tubes to show a typical installation within the purview of the present invention.

Referring more particularly to the drawings, 10 designates an aircraft having among other essentials a fuselage 11 and fixed wing 12. In accordance with the present invention a plurality of missile launch tubes 13 is mounted in a fixed substantially vertical position internally of the fuselage 11, fore and aft of the wing 12 so as to generally balance relative to the aircraft c.g. For reasons to become more apparent each tube 13 is made up of three parts, viz. an upper tube section "U", a lower tube section "L" and an intermediate tube section "I", all secured one to the other and to associated aircraft structure "S" by appropriate fasteners 13'.

The upper and lower surfaces of the fuselage 11 adjacent opposite ends of the tubes 13 are open to permit access whereby a missile 14 is installed in each tube 13. A removable door 15 is associated with each of these openings to permit the closure thereof when missiles have been installed and during flight of aircraft 10. The aerodynamically clean and uninterrupted surface of the aircraft fuselage 11 is thereby preserved during normal flight modes.

In the preferred form of the invention the outer wall or shell of each missile 14 is formed or otherwise provided with grooves or slots 16 complemental to and which engage both an upper set of dogs 17 and a lower set of dogs 18 when the missile 14 is secured in the tube 13. Both sets of these dogs 17 and 18 are evenly spaced around the periphery of the missile 14 with the number of dogs 17 and 18 required being dependent upon the weight of the missile 14 and the load factor employed.

The upper set of dogs 17 are contained in the launch tube 13 and take only downward loads. The lower set of dogs 18 are contained in a release/jettison slide 19 and take only upward loads. The slide 19 is operable in a cutout 20 in the wall of the tube 13 defined by the tube sections U and L and a cavity 21 extending from the cutout 20 and defined by the tube sections U and I. The lower dogs 18 thereby transmit upward loads into the slide 19 which is normally prevented from moving by hydraulic pressure in the upper portion of the cavity 21 supplied thereto through an annular port 22 in section "I" of the tube 13 connecting at least one and preferably a plurality of conventional fittings 23 from any convenient, remote source. A one-way check valve 23' is operatively connected in the line between the remote source and the fittings 23. Thus, hydraulic pressure applies a load on the upper surface of the slide 19 just sufficient to overcome the design load, normally in the order of twice the weight of the missile 14.

Adjacent the opposite end of the cavity 21 is another annular port 24 connecting at least one and preferably a plurality of conventional fittings 25 of return lines 26 whereby unpressurized fluid in the cavity 21 on the lower side of the slide 19 is vented during downward movement. Dynamic and static seals 19' and 13" are employed in conventional manner between the adjacent surfaces of the slide 19 and tube 13.

Figure 5:
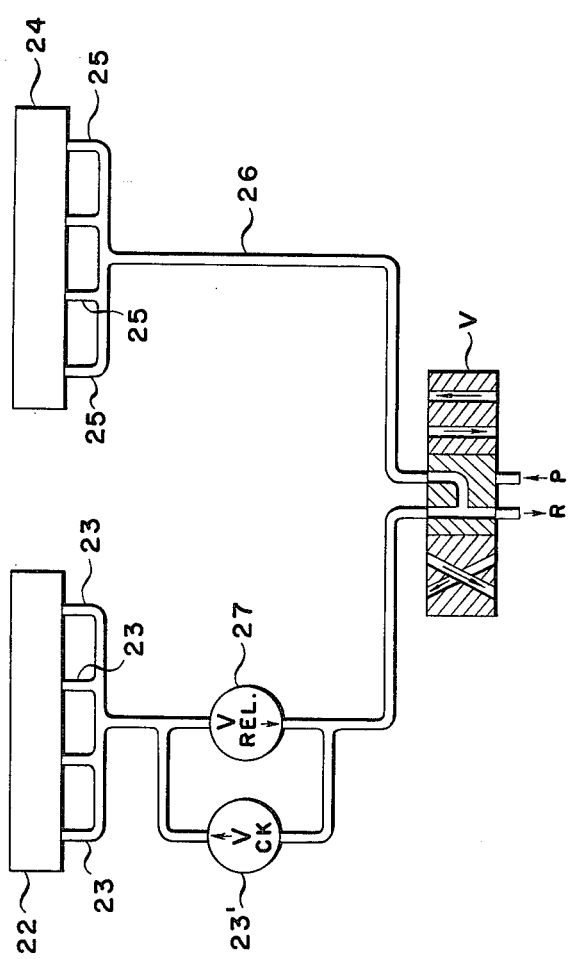
FIG. 5 is a schematic of the hydraulic system employed to actuate or to permit actuation of the support and retention mechanism.
Figure 2:
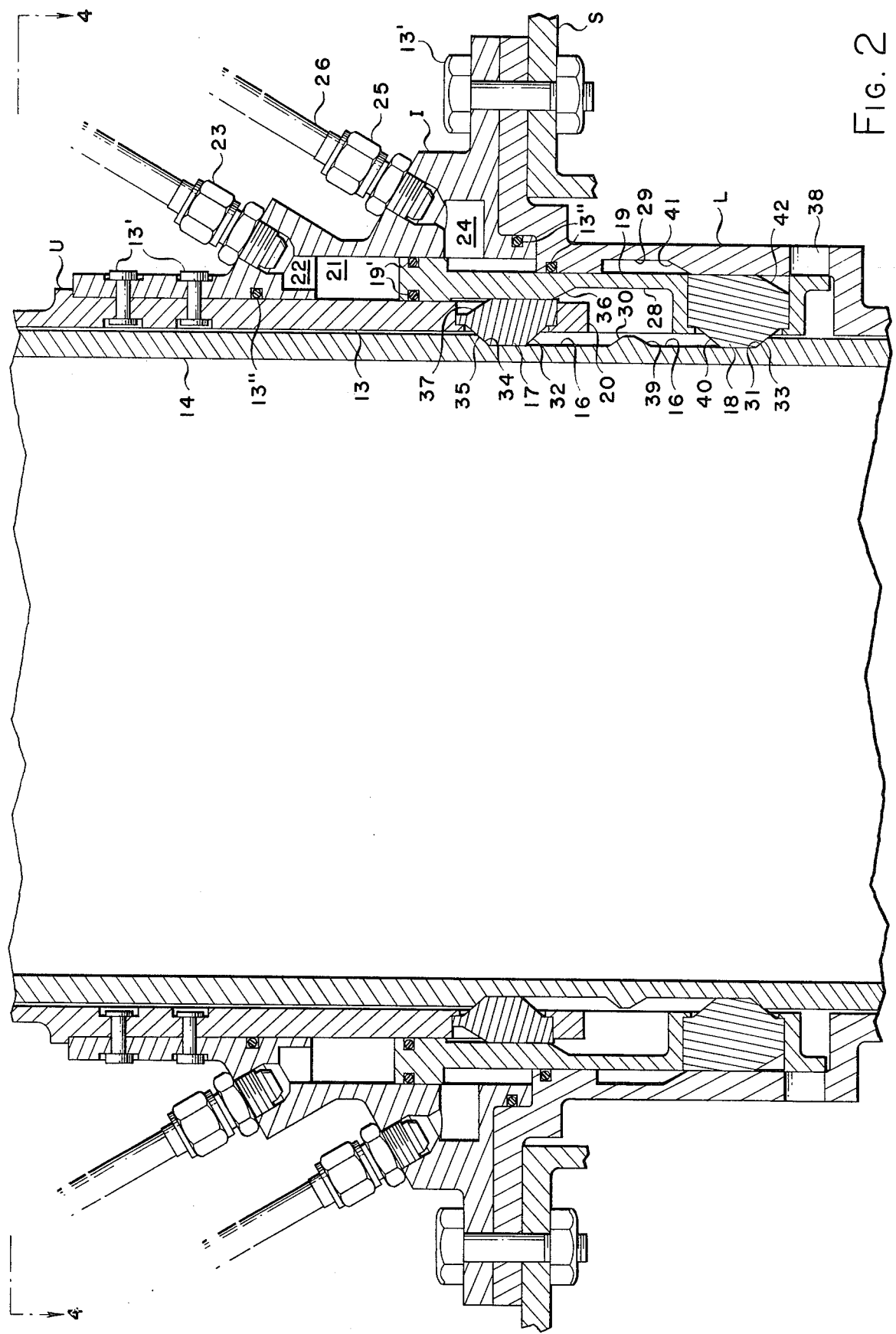
FIG. 2 is a longitudinal section taken through one of the missile launch tubes of FIG. 1 to show the missile support and retention mechanism as proposed herein located in its normal position immovably securing the missile in the desired position.

FIG. 2 shows the static missile position applicable to the aircraft 10 when on the ground, during take-off and landing as well as when in flight. While the aircraft 10 is on the ground with the missile 14 installed the upper end of the cavity 21 may be depressurized, if desired, since there is no possibility of an upload on the missile 14. However, repressurization is necessary prior to taxi and takeoff. This is accomplished by actuating the control valve V (FIG. 5) to move it (to the right) out of the neutral position shown to the position whereby ports 22 are connected to pressure P and ports 24 are simultaneously connected to return R.

The operation of the above described mechanism during a hot launch will now be described. With the valve V moved to the right (FIG. 5) and the upper end of the cavity 21 pressurized as above described, when the missile propellant or booster is ignited the thrust is carried through the shell 14 to the lower dogs 18 which transmit the thrust to the release/jettison slide 19. As the thrust load thus transmitted exceeds the system pressure as applied in the upper end of the cavity 21, a relief valve 27 connected in parallel with the check valve 23' in the hydraulic system attached to the fittings 23 opens and the upper end of the cavity 21 is depressurized. The missile thrust then moves the missile 14 and slide 19 upward until the slide 19 is stopped by contact with the upper surface of the annular cavity 21 (FIG. 2). At that time the upper and lower dogs 17 and 18 are in alignment with recesses 28 and 29 respectively in the slide 19 and in the wall of the lower section "L" of the tube 13. Force is exerted by the inclined surfaces 30 and 31 of the grooves or slots 16 in the missile wall against the inclined surfaces 32 and 33 of the upper and lower dogs 17 and 18 forcing them into the slide and tube recesses 28 and 29 simultaneously. All restraint on the missile 14 is thereby released and the missile is free to be launched under the force of its propellant or booster (FIG. 3).

Figure 3:
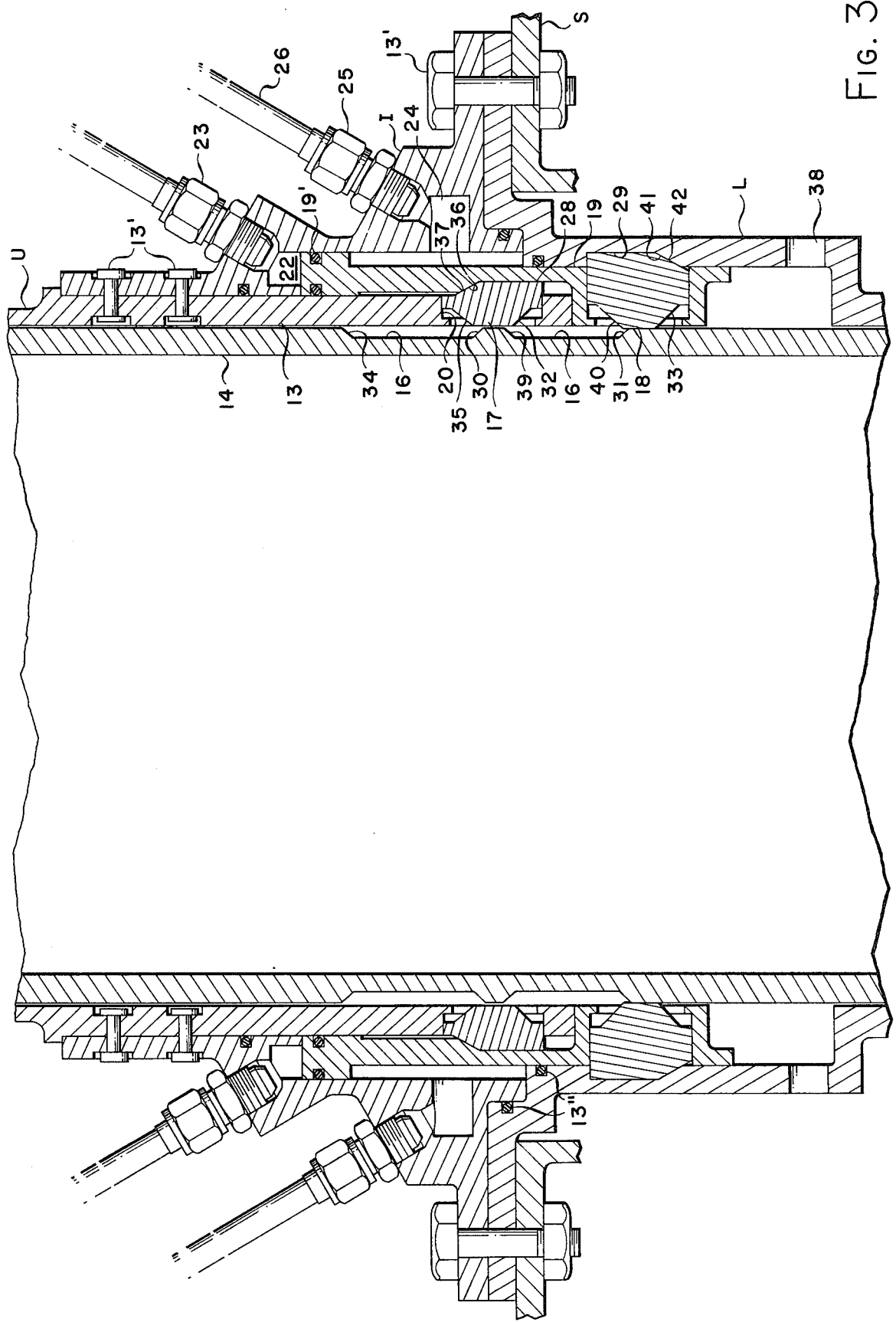
FIG. 3 is a similar view showing the mechanism in the released position, i.e., the position during loading and unloading of the missile as well as prior to and during hot launch or jettison of the missile.
Figure 4:
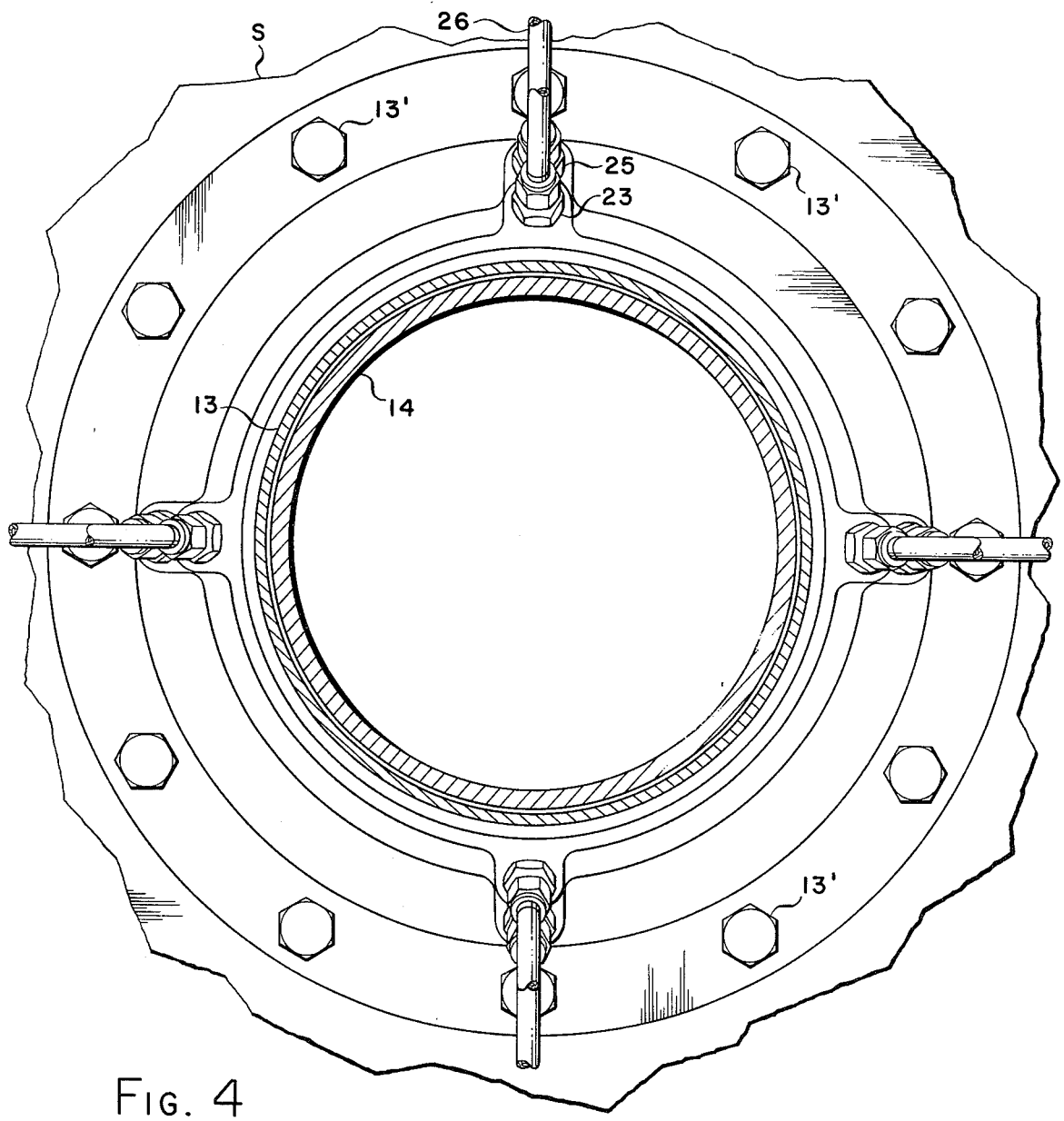
FIG. 4 is a transverse section taken along line 4—4 of FIG. 2.

The operation of the mechanism for missile jettison is similar to the hot launch operation just described with the exception that hydraulic pressure rather than missile thrust moves the slide 19 from the position of FIG. 2 to that of FIG. 3. Since the missile 14 is being jettisoned due to failure to ignite there is no thrust on the missile and gravity forces on the missile 14 cause it to drop out of the bottom of the launch tube 13.

In order to accomplish the jettison of the missile 14 the hydraulic system connected to the fitting 25 is pressurized and fluid flows through ports 24 into the lower end of the cavity 21. This is accomplished by moving the valve V to the left (FIG. 5) whereby ports 24 are connected to pressure P while ports 22 are simultaneously connected to return R. The pressure thus exerted on the lower surface of the slide 19 exceeds the pressure on the upper surface of the slide 19 and the relief valve 27 opens and depressurizes the upper portion of the cavity 21. The slide 19 then moves upward until the upper surface thereof contacts the wall of the cavity 21. At this time the dogs 17 and 18 all align with their respective recesses 28 and 29 in the slide 19 and lower tube section L. The upper inclined surfaces 34 on the upper groove 16 then exert a force on the upper inclined surfaces 35 of the upper dogs 17 moving them into their respective recesses 28. Simultaneously the upper inclined surfaces 39 of the lower groove 16 contact the upper inclined surfaces 40 of the lower dogs 18 forcing them into their respective recesses 29. The missile 14 is then free to drop out of the bottom of the tube 13.

The operation of the mechanism for loading a missile 14 into the launch tube 13 from either above or below the aircraft 10 will now be described. The hydraulic system connected by the fittings 23 is depressurized and the hydraulic system connected by fittings 25 is pressurized (the valve V is moved to the left in FIG. 5) as in the case of jettison of the missile 14 just described) causing the slide 19 to move upward until it contacts the wall of cavity 21. This aligns the recesses 28 and 29 with the upper and lower dogs 17 and 18. As the missile shell 14 enters the tube 13 it contacts the inclined surfaces of the dogs 17 and 18 one at a time causing them to move into the recesses 28 and 29. When the missile shell 14 is precisely in position and held there the hydraulic system connected by the fittings 25 is depressurized and the hydraulic system connected by the fittings 23 is pressurized (valve V is moved to the right in FIG. 5) causing the slide 19 to move downward. The inclined surfaces 36 of the recesses 28 exert a force on the inclined surfaces 37 of the dogs 17 moving them into their upper grooves 16 in the missile shell 14. The slide 19 continues to move downward until it reaches the position shown in FIG. 2 at which time the upper dogs 17 are held firmly in engagement with the missile shell 14 by the slide 19. Simultaneously the inclined surfaces 41 in the recesses 29 exert a force on the inclined surfaces 42 of the dogs 18 moving them into the lower grooves 16 of the missile shell 14 and the lower dogs 18 are held firmly in engagement with the missile shell 14 by the tube 13. Where grooves 16 are employed in the missile wall (as is the case illustrated) it is necessary to locate the missile 14 precisely in the vertical direction only. If slots were to be employed, however, (for aerodynamic purposes), it would be necessary to align the slots with the dogs 17 and 18 also. An opening 38 is provided in the launch tube 13 to permit visual inspection of the missile position prior to locking the missile 14 in place and the location of the slide 19 to assure the dogs 17 and 18 are properly engaged in the missile shell.

The operation of the mechanism for unloading a missile 14 on the ground is the same as the operation of the mechanism for missile jettison. When unloading, however, the missile 14 must be firmly held while the mechanism operates.

While the invention has been hereinabove illustrated and described in what is believed to be its best and most practical form under present-day conditions, it is recognized that under other conditions this form would be modified. No attempt has been made to specifically incorporate any of such other forms in this disclosure in the interest of clarity of the total inventive concept. The claims are relied upon to cover these other forms generally.

What is claimed is:

1. A support and retention mechanism for a missile in a launcher mounted in substantially a vertical position on a vehicle comprising:

at least one dog carried by said launcher and having extended opposite sides adapted to seat alternatively in complemental grooves in said missile and in said launcher;

a retainer for each said dog slideably mounted in said launcher and adapted to move to and from extreme positions whereby each said extended side is held in said missile groove and the missile thereby engaged by said launcher and each said extended side is released for movement out of said missile groove into said launcher groove and the missile thereby disengaged by said launcher; and, a fluid pressure system selectively operative on the upper and lower ends of said retainer to move it to and from, as well as hold it in, its extreme positions aforesaid, the pressure of said system being less than the force operative on said missile when ejected from said launcher, said system including:

a control valve having a neutral position connecting both ends of said retainer to return and alternate positions connecting a selected one of said retainer ends to pressure and simultaneously connecting the other of said retainer ends to return, and a check valve and a relief valve connected in parallel in said system between said control valve and said upper retainer end.

2. The mechanism of claim 1 wherein a plurality of spaced dogs are employed around the periphery of said missile.

3. The mechanism of claim 1 including an opening in the launcher to permit visual inspection of the location of said missile and said retainer to assure that each said dog is engaged in its missile groove.

4. The mechanism of claim 1 wherein said launcher is open at opposite ends, an upper and a lower set of dogs are employed, each set comprising a plurality of spaced dogs around the periphery of said missile and the adjacent surfaces of said dogs and their respective grooves include inclined surfaces whereby said dogs are moved laterally upon relative vertical movement between said missile and said retainer.

5. The mechanism of claim 5 wherein said inclined surfaces are so disposed that said upper set of dogs take only downward loads on said missile and said lower set of dogs take only upward loads on said missiles.

6. The mechanism of claim 1 wherein two dogs are employed in vertical alignment one to the other and the adjacent surfaces of said dogs and their respective grooves include inclined surfaces whereby said dogs are moved laterally upon relative vertical movement between said missile and said retainer.

7. The mechanism of claim 6 wherein said vehicle is an airplane and said launcher is open at opposite ends which terminate adjacent the external surfaces of said airplane and including a removable door overlying and covering each said launcher end, the external surface of each said door being contoured to conform to the adjacent airplane surface and thereby form a clean aerodynamic continuation thereof.

8. The mechanism of claim 7 wherein a multiplicity of said launchers are mounted in the fuselage of said airplane equally balanced about the center of gravity thereof.

* * * * *